United States Patent [19]

Sharma

[11] Patent Number: 4,931,304

[45] Date of Patent: Jun. 5, 1990

[54] FLAVOR ABSORBED NUTS PROCESS

[75] Inventor: Shri C. Sharma, Mendham, N.J.

[73] Assignee: Warner-Lambert Company, Morris Plains, N.J.

[21] Appl. No.: 822,431

[22] Filed: Jan. 27, 1986

Related U.S. Application Data

[63] Continuation-in-part of Ser. No. 794,251, Oct. 30, 1985, abandoned, which is a continuation-in-part of Ser. No. 570,474, Jan. 13, 1984, abandoned.

[51] Int. Cl.$^5$ .............................................. A23L 1/36
[52] U.S. Cl. ..................................... 426/632; 426/629
[58] Field of Search ................................ 426/632, 624

[56] References Cited

U.S. PATENT DOCUMENTS 3,457,087  7/1969  Renner et al. ...................... 426/438
4,522,833  6/1985  Sharma

OTHER PUBLICATIONS

Matz Snack Food Technology, 1976, Avi:Westport, Conn., p. 173.

Primary Examiner—Joseph Golian
Attorney, Agent, or Firm—Charles A. Gaglia, Jr.

[57] ABSTRACT

A process for flavoring edible nuts which comprises: roasting the nuts at about 138° C. to about 200° C. for about 4 minutes to about 12 minutes; partially cooling the nuts to a temperature of about 56° C. to about 92° C.; applying a volatile flavoring agent to the partially cooled nuts and blending the nuts until the flavor agent is absorbed by the nuts; cooling the nuts to room temperature; and recovering the flavored nuts.

17 Claims, No Drawings

FLAVOR ABSORBED NUTS PROCESS

This is a continuation-in-part of U.S. Ser. No. 794,251 filed Oct. 30, 1985 now abandoned, which is a continuation-in-part of U.S. Ser. No. 570,474 filed Jan. 13, 1984 now abandoned.

BACKGROUND OF THE INVENTION

Raw edible nuts generally have a "beany" flavor which is not pleasant to the taste. It is well known that the flavor of nuts or beans can be improved by roasting. The The roasting is accomplished using either heated air or hot oil. The usual roasting temperatures are about 138° C. to 200° C., depending on the particular nut or bean being roasted and the preferences of the processor.

It is common practice to attempt to modify or improve the flavor of the roasted nut or bean. This is accomplished by the use of coatings and flavor oils.

For example, U.S. Pat. No. 4,161,545, discloses a method for applying a honey based coating to nuts. Similarly, U.S. Pat. No. 3,671,766 discloses a process for coating nuts with hexatol containing compositions. U.S. Pat. No. 4,053,650 discloses a method for coating nuts with cereal and wheat flour compositions which are baked onto the roasted nut. U.S. Pat. No. 4,085,230 discloses a process for processing nuts which includes an initial step of cooking the nuts in boiling water for a period of time before roasting. In a final coating step salt and flavoring are applied to the cooled nuts.

Various nut processing techniques are directed to improved defatted nut products. U.S. Pat. No. 3,294,549 describes a process for reconstituting defatted, pressed peanuts with salts, spices and sweeteners. U.S. Pat. No. 3,740,236 discloses a method for reconstituting defatted nuts and applying a coating containing flavorings. U.S. Pat. No. 4,049,833 discloses a method for processing partially defatted nuts which includes contacting the nuts with a glycerol-containing solution. The process is carried out by heating the nuts to about 200° F. in a water solution of glycerol. A variety of coatings comprising gums, spices, sugar, flavorings and so forth are applied to the surface.

U.S. Pat. No. 3,457,087 discloses a method for eliminating "spotting" on nuts which is associated with blanching and roasting processes. The process involves the quenching of hot roasted nuts in copious amounts of cold oil which is said to be absorbed into the nut. Flavorings can be included in the quench oil.

While the process of U.S. Pat. No. 3,457,087 described above may be effective in preventing nut "spotting" problems, no appreciable flavoring is absorbed by the nut. In fact, none of the prior art processes are successful in having the flavoring absorbed into the structure of the nut. The reason for this is readily apparent from an examination of the roasting process as it affects the nut.

During the initial part of a nut roasting process water is removed from the nut which generally has an initial moisture content of about 4% to 8% by weight. Until the water content is reduced to about 1.5% to 2.5% no browning or flavor development occurs. In addition to loss of water and other volatiles such as aromatics and air the cell structure expands and nut oil moves out of the nut kernel to its surface.

As a result of the loss of volatiles thermal expansion of the nut occurs, forming many small cracks and fissures in the nut. According to U.S. Pat. No. 3,457,087, at this point the nut should be capable of absorbing flavorings readily. However, flavoring added to the hot nuts are generally volatilized and only a minor amount, if any, remains to be absorbed by the nut. Once the nut has cooled the surface oil is absorbed, the nut contracts and the moisture content is equilibrated with the ambient conditions, that is about 2% by weight moisture.

As a result of these physical phenomena of the nut during roasting and cooling, the prior art processes fail to impart substantial flavor to the nut itself. In the process of U.S. Pat. No. 3,457,087, for example, the cold oil is applied to hot nuts and as a consequence the flavoring is volatilized in the region immediately adjacent to the nut. There has been a failure in the prior art to recognize that nut surface temperature during the application of flavorings to nuts is critical if the flavoring is to be absorbed rather than remain merely as a surface coating.

SUMMARY OF THE INVENTION

It has surprisingly been found that flavorings will be absorbed by nuts if they are applied during the cooling cycle at about 56° C. to about 92° C. It has further been found, that when the sorbed flavorants are volatile or have a volatile component, the resultant flavored nut has sorbed more flavorant than an uncooled hot nut. The quantity of flavoring or oil containing flavorings must be minimized so as not to cool the nuts substantially during the application process. After the flavor is adsorbed the nuts are cooled.

DETAILED DESCRIPTION

This invention relates to a method of incorporating flavorants into roasted edible nuts and beans. More particularly, it relates to a method of imparting flavor to nuts and beans by contacting the nuts with volatile flavoring agents at controlled temperatures prior to cooling the roasted nut to room temperature.

The nut roasting process can be broadly classified into three different phases. As used in the specification and claims, the term "edible nut" shall mean any edible nut or bean which is eaten in roasted form. The first phase of nut roasting consists of a rapid loss (at negative exponential rate) of moisture and "beany" aroma from the nut kernels, without a significant development of color or roasted nut flavor. The moisture content of the nut at the end of this phase is about 2.5%, down from 4 to 8% moisture for raw shelled nuts. The second phase consists of the development of brown color, roasted nut flavor, volumetric expansion of nut kernels, loss of undesirable beany aroma, and an exudation of oil from within the cellular structure to nut surface. The roasting is practically completed during the third phase, with the nuts attaining a uniform brown color, roasted nut flavor and a moisture content of about 1.5%.

The cooling process can be broadly classified into two phases. The first phase involves bringing the temperature of kernels down to about 95° C., at a rapid rate (in about 2 to 4 minutes) to stop the color and flavor changes initiated during roasting. The kernels also go through some volumetric contraction and the oil exudated during roasting is absorbed within the nut. These changes are not obvious to those skilled in the art and have been surprisingly discovered as a part of the present invention. The second phase of cooling the nuts consists of cooling the nuts down to about room temperature from about 95° C. The nut undergoes major physical changes during this phase. These changes consist of a rapid volumetric contraction associated with a potential absorption of the available excipients from its immediate environment. The excipients may include flavors, moisture, odors, etc., along with the carriers such as oil, water, steam. In general, any liquid or gaseous material with a positive gradient from nut surface to within it can be absorbed into the nut.

The physico-chemical changes described above which the nut kernel undergoes during roasting and cooling have not been understood in the past. While the invention is not to be limited to theoretical considerations, it is believed that when the hot nut comes into contact with a volatile flavoring agent, the volatile component(s) of the flavoring agent are vaporized at the hot nut surface. This results, in the case of a single component flavoring agent, in a reduced amount of flavorant being available for sorbtion into the nut. In the case of a multi-component flavorant, only the volatile components are vaporized leaving a distorted flavoring agent depleted in volatile components to be sorbed by the nut. The invention provides for the efficient sorbtion of volatile flavoring agents and for the undistorted sorbtion of volatile multi-component flavoring agents by roasted nuts, seeds and beans which have been pre-cooled to about 56° C. to about 92° C. before being flavored.

As used in the specification and claims, the term "flavoring agent" means a flavor oil or any oil soluble, or oil dispersible, natural or synthetic flavoring. The flavoring agent may have a single component or be a mixture of components. When a single component flavoring agent or one or more components of a multi-component flavoring agent have a flash point about 10° C. or more below the roasting temperature of nuts, then that flavoring agent is a "volatile" flavoring agent. As used in the specification and claims, the term "flash point" is the temperature at which a component will change state from a liquid or solid to the vapor state such that the vapor above a volatile combustible substance will ignite in air when exposed to a flame. The term "hot nut" as used in the specification and the claims refers to a nut at roasting temperatures.

Flavor agents with a flash point less than 10° C. below the roasting temperature of nuts will not be volatilized by the hot roasted nuts and therefore the flavored nut product would not be significantly improved by first precooling the nut to about 92° C. to about 56° C. before applying the flavor. Volatile flavor agents with a flash point more than 30° C. less than the temperature of the pre-cooled nuts to be flavor treated will volatilize when brought into contact with the precooled nuts and therefore the flavored nut product would not be significantly improved by the inventive process.

Illustrative non-limiting examples of volatile flavor agents useful in the practice of this invention are:

oil soluble smoke flavor (hickory), cheddar cheese concentrate, nacho cheese concentrate, peppermint; extracts of garlic, anise, citronella, ginger, oregano, celery seed, cinnamon-bark, cinnamon-root, pimento, cardamon, chemical compounds which impart condiment flavor such as: allyl isothiocyanate, allyl mercaptan, cinnamaldehyde, cinnamyl acetate, p-cymene, engenol, engenyl formate, heptanal, p-methylanisole, alpha-pinene, piperidine, and so forth. Therefore, in prior art there has been a substantial lack of application of these changes in controlled inpregnation of flavorings to the nuts.

Volatile flavor agents can be dispersed in any edible carrier oil, for example, peanut oil, hydrogenated soybean oil, coconut oil, almond oil. The preferred vehicle for the volatile flavoring agent is almond oil. The highly unsaturated oils such as soybean oil, safflower oil and sunflower oil tend to become rancid more readily than other oils. This results in an unacceptable flavor in the nuts, heated in accordance with this invention, upon storage. Hence, it is preferred that the edible oil have an iodine value which is less than the iodine value of the natural oil of the nut to be treated. Table I shows the solidification point and iodine value for various vegetable and nut oils.

TABLE I

| Solidification Point and Iodine Value of Oils and Fats | | |
|---|---|---|
| Name | Solidification Point, °C. | Iodine Value |
| Almond | −15 to −20 | 93 to 103.4 |
| Black Walnut | turbid −12 | 141 to 142.7 |
| Butter Fat | 20 to 23 | 26 to 38 |
| Coconut | 14 to 22 | 6.2 to 10 |
| Cocoa (Cacao) Butter | 21.5 to 23 | 32.8 to 41.7 |
| Corn | −10 to −20 | 111 to 128 |
| Cottonseed | +12 to −13 | 103 to 111.3 |
| Lard Oil | 27.1 to 29.9 | 47 to 66.5 |
| Olive | turbid + 2,ppt −6 | 79 to 88 |
| Palm | 35 to 42 | 49.2 to 58.9 |
| Peanut | 3 | 88 to 98 |
| Poppy Seed | −16 to −18 | 128 to 141 |
| Pumpkin Seed | −15 | 121 to 130 |
| Rape Seed | −10 | 94 to 105 |
| Sesame | −4 to −6 | 103 to 117 |
| Soya, Soya, or Soja Bean | −10 to −16 | 122 to 134 |
| Sunflower | −17 | 129 to 136 |
| Walnut | −15 to −27 | 139 to 150 |

The oils having high iodine numbers are preferably used only after at least partial hydrogenation to reduce their iodine number. While liquid edible oils are the preferred vehicles for the flavoring agent, solid hydrogenated oils can be used provided that their solidification point is below the temperature at which they will be applied to the nuts.

The term "carrier oil" as used in the specification and claims means any suitable vehicles for the volatile flavoring agent which meet the foregoing criteria.

It is within the scope of this invention to apply certain volatile flavoring agents without the use of a carrier oil. For example, concentrated volatile flavorings such as cheese flavorings can be applied to the nut in their neat form.

It is first necessary to roast the nuts to be treated before flavoring. If flavoring agents are added to the raw nut, they will be lost or altered during the roasting of the nut, resulting in inadequate, undesirable or distorted flavor.

In applying the volatile flavoring agent to the nut where a carrier oil is used the weight ratio of carrier oil to volatile flavor agent is about 0.4 to about 2.5; preferably about 0.5 to about 2.0; and more preferably about 0.6 to about 1.6. The weight percent of volatile flavor agent applied to the nuts is about 0.5 to about 2.5% by weight based on the nuts; preferably about 0.75 to about 2.10%; more preferably about 0.8 to about 2.0 weight percent.

In the practice of this invention the nuts are roasted at about 138° C. to about 200° C.; more preferably about 154° C. to about 180° C.; more preferably about 165° C. to about 171° C. The actual roasting temperature used will depend on the particular nut being roasted. The roasting time can vary from about 4 minutes to 12 minutes; preferably about 8 minutes to about 10 minutes. The roasting time, too, will be dependent on the type of nut being roasted. Generally, the thinner and less dense the nut meat the lower the roasting temperature and the shorter the roasting time.

In applying the volatile flavoring agent to the roasted nuts the nut are first cooled to about 92° C. to about 56° C.; preferably about 80° C. to about 63° C.; more preferably about 70° C. to about 65° C. The volatile flavor agent is then applied to the nuts and the nuts tumbled until all of the flavor agent has been absorbed. The nuts are then cooled to room temperature. While salt can be added to the nuts with the flavor agent, it will generally be applied after the nut is cooled. Other coatings such as spices, herbs and additional flavor agents can be added to the nut after cooling.

Absorption of the volatile flavor agent by the nut can take about 1.5 to about 2.5 minutes. Generally it will be accomplished in about 2 minutes. Visual observation can be used to determine when the volatile flavor agent been completely absorbed. It is more advantageous, however, to determine the time for sorption and use it as a process control parameter.

The process of this invention can be applied to any edible nut or bean which is roasted prior to eating. As used in the specification and claims the term "edible nut" shall mean any edible nut or bean which is eaten in a roasted form. Illustrative, non-limiting examples of the edible nuts of this invention are peanut, macadamia, pecan, almond, soybean, chick peas, cashew, hazelnut, walnut and so forth.

When applying a final salt or volatile flavor coating to the nut after cooling, this final coating can comprise about 0.5 to about 3.5% by weight based on the nut; preferably about 0.6 to about 1.25% by weight; more preferably about 0.7 to about 0.9% by weight.

The advantages of this invention may be more readily appreciated by reference to the following examples. Unless otherwise indicated, all percents are percents by weight based on the weight of nuts.

EXAMPLE I

Four thousand grams of shelled, raw almonds were uniformly coated with about 55.56 grams of almond oil and roasted in a circulating forced air chamber of a Proctor and Schwartz tray drier under a static pressure of 1.0 mm at 160° C. for 9 minutes. The heated almonds were transferred to a variable speed forced gas Proctor and Schwartz cooler and cooled for 1 minute until the nut temperature was 87.8° C. The partially cooled nuts were transferred to a baffled coating pan and a blend of 35.6 grams of almond oil and 84 grams (2.1% by weight based on the nuts) of oil soluble smoke flavor was applied to the roasted nuts while cascading. Cascading was continued until all of the almond oil and flavor agent were absorbed (about 2 minutes). The coated almonds were then cooled under forced air for an additional 4 minutes and transferred to a baffled coating pan where 50 grams (1.25% by weight based on the nuts) of extra fine salt was applied uniformly to the cascading almonds. The cooled product which had a distinct and pleasant smoke flavor was packaged under nitrogen.

EXAMPLE II

Four hundred fifty (450) grams of blanched (skinless) almonds were roasted for 9 minutes at 160° C. in the manner described in Example I and cooled for 1 minute in forced air to a temperature of 87.8° C. The partially cooled nuts were transferred to a baffled coating pan where a blend of 8.7 grams of oil soluble smoke flavor (1.95%), 6.2 grams of almond oil and 5.6 grams of extra fine salt (1.25%) was applied to the cascading nuts and blended until all of the flavor agent was absorbed. The flavored nuts were cooled for an additional 4 minutes in the Proctor and Schwartz forced gas cooler. They had a distinct and pleasant smoke flavor.

EXAMPLE III

One thousand (1,000) grams of almonds were roasted at 165.5° F. for 4 minutes in partially hydrogenated soybean oil (4.5 gal) and cooled 1 minute under forced air to 87.8° C., 19.45 grams of oil soluble smoke flavor (1.945%) were applied to the nuts in the manner of Example II. The cooled nuts were coated in a baffled coating pan with 12.5 grams (1.25%) extra fine salt. The nuts had a distinct and pleasant smoke flavor.

EXAMPLE IV

Example I was repeated using 77.78 grams (1.945%) of smoke flavor instead of 84 grams. The nuts had a distinctive smoked flavor. The nuts maintained their distinct, pleasant smoke flavor even at the lower flavor level.

EXAMPLE V

The method of Example I was used to prepare flavored almonds. 225 grams of almonds were roasted at 160° C. for 8.5 minutes and cooled for 2 minutes to 71° C. A blend of 4.0 grams of almond oil, 2.0 grams of cheddar cheese concentrate (0.89%) and 2.8 grams of extra fine salt (1.25% by weight) was applied to the nuts and the flavored product was then cooled 4 minutes to bring the temperature down to 80° F. The cooled product was packaged under nitrogen. The nuts had a rich cheddar cheese flavor.

EXAMPLE VI

Four hundred fifty (450) grams of peanuts were roasted under forced air at 171° C. for 8.5 minutes and cooled for 2 minutes to 76.7° C. in the manner described in Example I. A blend of 6.0 grams of peanut oil, 3.6 grams of artificial nacho cheese flavor (0.8%) and 5.4 grams (1.2%) extra fine salt was applied to the partially cooled nuts, and the flavored nuts were cooled for 5 minutes to room temperature. The cooled product was packaged under nitrogen. The nuts had a distinct and pleasant nacho flavor.

The flavored nuts all had distinctive flavors superior to prior art flavored nuts commercially available. The nuts exhibited good shelf life and flavor stability.

EXAMPLE VII

In order to demonstrate the advantages of applying flavoring agent at the temperature range of this invention peanuts were treated at various temperatures with soybean oil which had dissolved into it 0.2% by weight of oil of Violet #2 dye and peppermint flavor. The weight ratio of flavoring to oil was 1:1. About 4% by weight, based on the nuts, of the oil containing dye and flavoring was applied to the nuts in each case.

The peanuts were roasted at 171° C. for 8.5 minutes and cooled for different cooling times. The nut temperature was measured by holding the nuts in a double walled insulated flask while probing the nuts with a thermister. The range of temperatures found for ten readings was recorded. After cooling for the specified time the oil/dye/flavoring mixture was blended into the nuts in a baffled coating pan and blended until the oil was absorbed.

The depth of penetration of dye was measured. The quality of the flavoring absorbed was measured using gas chromatography. The G.C. flavor peaks for the absorbed flavor were compared to the flavor peaks for the original flavoring.

Table II shows the results of these studies. The depth of penetration was determined by slicing the nut perpendicular to the cortyledon axis. The reading recorded is the part of the total diameter of the nut which showed dye penetration. Since the dye and flavoring were dissolved in the oil it is apparent that the depth of dye penetration measures the depth of both oil and flavoring penetration.

TABLE II

Measurement of Oil Penetration and Flavor Quality

| Cooling Time (Sec.) | Nut Temperature (°C.) | Depth of Dye Penetration | Nut Appearance | Flavor Quality |
|---|---|---|---|---|
| 0 | N150 | ½ | Good, heavy | Distorted |
| 30 | 110–118.3 | ½ | Good dye coverage | Distorted |
| 60 | 87.8–90.5 | ⅓ | Good dye coverage | Good |
| 90 | 58.9–62.8 | ¼ | Good dye coverage | Good |
| 120 | 53.3–54.4 | Very little | Light uniform coverage | No flavor |
| 240 | 35–37.8 | Minimal | Mottled | No flavor |
| 300 | 32.2 | None | Mottled | No flavor |

It is apparent from the data that below 55° C. no flavoring is absorbed, while at 110° C. the flavor is distorted notwithstanding deep penetration. The distorted flavor shows a reduction in the amounts of volatile flavor components in the flavor absorbed by the nuts. Hence, temperature of application of flavoring is critical to obtaining a flavored nut product with acceptable flavor.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for flavoring edible nuts, seeds and beans with a volatile flavoring agent which comprises:
   (a) roasting the nuts, seeds and beans at about 138° C. to about 200° C. for about 4 minutes to about 12 minutes:
   (b) partially cooling the nuts, seeds and beans to a temperature of about 56° C. to about 92° C.;
   (c) applying a volatile flavoring agent to the partially cooled nuts, seeds and beans and blending the nuts, seeds and beans until the volatile flavoring agent is absorbed by the nuts, seeds and beans while maintaining the temperature of the nuts, seeds and beans in the range of about 56° C. to about 92° C.;
   (d) cooling the nuts, seeds and beans to room temperature; and
   (e) recovering the flavored nuts, seeds and beans.

2. The process according to claim 1 wherein the volatile flavoring agent is blended with an edible carrier oil.

3. The process according to claim 2 wherein the carrier oil is peanut oil or almond oil.

4. The process according to claim 1 wherein the roasting temperature is about 150° C. to about 171° C.

5. The process according to claim 1 wherein the nuts, seeds and beans are roasted for about 6 to about 10 minutes.

6. The process according to claim 1 wherein the volatile flavoring agent is applied at about 0.5% by weight to about 2.5% by weight based on the nuts, seeds and beans.

7. The process according to claim 6 wherein the weight percent of volatile flavoring agent is about 0.75 to about 2.1% by weight.

8. The process according to claim 7 wherein the weight percent of volatile flavoring agent is about 0.8 to about 2.0% by weight.

9. The process according to claim 2 wherein the edible carrier oil and flavoring agent are combined in a weight ratio of oil to volatile flavoring agent of about 0.4 to about 2.5.

10. The process according to claim 9 wherein the weight ratio is about 0.5 to about 2.0.

11. The process according to claim 10 wherein the weight ratio is about 0.6 to about 1.6.

12. The process according to claim 1 wherein the nuts, seeds and beans are partially cooled to a temperature of about 63° C. to about 80° C.

13. The process according to claim 1 wherein the edible nut, seeds and beans is peanut, walnut, macadamia nut, cashew, almond, pecan, soybean or chick pea.

14. The process according to claim 1 wherein the room temperature nut, seed and bean is coated with salt.

15. The process according to claim 2 wherein salt is included in the blend of edible carrier oil and volatile flavoring agent.

16. The process of claim 1 wherein the nuts, seeds and beans are cooled in step (b) in a gaseous environment.

17. The process of claim 16 wherein the gaseous environment is air.

* * * * *